UNITED STATES PATENT OFFICE.

JAMES KENNELLY, OF HARTFORD, CONNECTICUT.

IMPROVED METAL FOR HORSESHOES, &c.

Specification forming part of Letters Patent No. 38,046, dated March 31, 1863.

*To all whom it may concern:*

Be it known that I, JAMES KENNELLY, of Hartford, in the county of Hartford and State of Connecticut, have invented a new and Improved Metallic Composition for Casting Horseshoes, &c.; and I do hereby declare that the following is a full, clear, and exact description of the same.

This composition consists of American charcoal-iron, bone-dust, manganese, ferrid-cyanide, hematite or common brick pulverized, and wolfram, mixed together in about the proportion hereinafter specified, so as to produce a metal suitable for casting horseshoes or other articles and capable of being hammered and forged similar to wrought-iron.

The proportions in which I mix the above-named ingredients together is about as follows: American charcoal-iron, thirty pounds; bone-dust, four ounces; manganese, two ounces; ferrid-cyanide, one ounce; hematite, six ounces; wolfram, seven ounces. For the six ounces of hematite fifteen ounces of pulverized common brick may be substituted.

The iron is packed in a crucible and the other ingredients are mixed together and put into the crucible with the iron, and the whole is melted together.

The composition thus produced is tough like cast-steel, and when run in suitable molds it can be used for various purposes, particularly for casting horseshoes. It is not liable to crack on cooling, and it is malleable, and can be heated and forged similar to wrought-iron. It is of particular advantage for casting horseshoes. It produces shoes of superior tenacity and durability, and with the proper molds a large number of horseshoes can thus be produced with much less labor than by forging.

What I claim as new, and desire to secure by Letters Patent, is—

The within-described composition, made of the ingredients herein specified, and mixed together about in the proportion and in the manner substantially as set forth.

JAMES KENNELLY.

Witnesses:
DWIGHT GLEEZIER,
B. F. DANTZ.